United States Patent
Marszalek et al.

[11] Patent Number: 6,145,345
[45] Date of Patent: *Nov. 14, 2000

[54] MODIFIED CHEMICAL VAPOR DEPOSITION USING INDEPENDENTLY CONTROLLED THERMAL SOURCES

[75] Inventors: Stanley F. Marszalek, Cranford; Katherine Theresa Nelson, Gillette; Kenneth Lee Walker, New Providence, all of N.J.; Kim Willard Womack, Duluth, Ga.; Man Fei Yan, Berkeley Heights, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/092,380

[22] Filed: Jun. 5, 1998

[51] Int. Cl.⁷ .................................................... C23C 16/40
[52] U.S. Cl. .................................. 65/414; 65/417; 65/423; 65/430; 427/163.2; 427/166; 427/255.35; 427/255.37; 427/255.39
[58] Field of Search .................... 427/163.2, 166, 427/248.1, 255.35, 255.37, 255.39; 65/414, 417, 423, 430

[56] References Cited

U.S. PATENT DOCUMENTS

| | | |
|---|---|---|
| 4,302,230 | 11/1981 | MacChesney et al. ............... 65/3.12 |
| 4,334,903 | 6/1982 | MacChesney et al. ............... 65/3.12 |
| 4,537,611 | 8/1985 | Douklias et al. ..................... 65/18.2 |
| 4,741,747 | 5/1988 | Geittner et al. ...................... 65/3.12 |
| 4,787,927 | 11/1988 | Mears et al. ......................... 65/3.12 |
| 5,110,335 | 5/1992 | Miller et al. ......................... 65/3.12 |
| 5,337,585 | 8/1994 | Berthou ................................. 65/391 |
| 5,397,732 | 3/1995 | Chen ....................................... 437/69 |
| 5,596,668 | 1/1997 | Walker .................................. 385/123 |
| 5,692,087 | 11/1997 | Partus et al. ......................... 385/123 |
| B1 4,334,903 | 7/1986 | MacChesney et al. ............... 65/3.12 |

FOREIGN PATENT DOCUMENTS

| | | |
|---|---|---|
| 0140113 | 5/1985 | European Pat. Off. . |
| 0303533 | 2/1989 | France . |
| 53-133045 | 11/1978 | Japan . |
| 60-122739 | 7/1985 | Japan . |
| 60-166243 | 8/1985 | Japan . |
| 08067524 | 3/1996 | Japan . |
| 8-067524 | 12/1996 | Japan . |

*Primary Examiner*—Timothy Meeks
*Attorney, Agent, or Firm*—Steven R. Bartholomew; Scott J. Rittman

[57] ABSTRACT

The deposition rate of MCVD processes is enhanced by applying at least a first and a second independently controlled heat source to a plurality of reactants which are used to form deposited particulate matter. The first heat source is adjusted so as to provide at least a specified rate of reaction for the reactants, and the second source is adjusted so as to provide at least a specified deposition rate for the particulate matter.

10 Claims, 2 Drawing Sheets

MODIFIED CHEMICAL VAPOR DEPOSITION USING INDEPENDENTLY CONTROLLED THERMAL SOURCES

RELATED PATENT APPLICATION

Related subject matter is disclosed in commonly-owned U.S. patent application Ser. No. 09/120,069, entitled "High Rate MCVD Method of Making an Optical Fiber Preform," filed on Jul. 8, 1998.

BACKGROUND

1. Field of the Invention

The invention relates generally to modified chemical vapor deposition (MCVD) processes, and, more specifically, to MCVD processes used to manufacture fiber optic cable.

2. Description of Related Art

One existing process for forming optical fibers, described in U.S. pat. Nos. 4,334,903 and 4,217,027, is commonly referred to as modified chemical vapor deposition (MCVD). In this process, chemical vapors which will be used to form glass are introduced within a first end of a hollow, cylindrical glass starting tube. As the tube is rotated about its axis of symmetry, a localized heat source is moved back and forth along the length of the tube, thereby creating a "hot zone" within the tube. As the chemical vapors pass through this hot zone, they react to form particulate matter which then deposits along the wall of the tube in a direction downstream from the first end of the tube. Subsequent passages of the localized heat source consolidate the particulate matter into a substantially clear glass layer. After formation of one or more glass layers, the tube is collapsed into a solid structure, and fiber optic cable is drawn from the collapsed tube.

One of the most critical steps in determining the overall speed of the MCVD process is the rate at which deposition occurs. Research efforts directed towards increasing the deposition rate have identified the thermal gradient within the tube as a primary mechanism governing the deposition process. In general, when particulates are located within a thermal gradient, they migrate from the higher-temperature regions of the gradient to the lower-temperature regions. This movement of particulates is attributable to the effect of relatively energetic molecules in the higher-temperature regions of the tube colliding with particulates suspended in the gas stream, driving these particulates to the lower-temperature regions of the tube. As the moving heat source first passes near a given section of the tube, the area within the tube that is relatively close to the wall is heated to a higher temperature than the area close to the central axis of the tube. However, soon after the heat source moves away from this section of the tube, the area near the central axis of the tube remains relatively hot, whereas areas near the tube wall cool down to temperatures below that of the central axis. Downstream of the moving heat source, this applied thermal gradient causes particulates to migrate from the center of the tube, where they are first formed, to the tube wall upon which they are then deposited.

Various techniques have been developed for controlling the thermal gradient of the MCVD tube so as to speed up the deposition process. For example, U.S. Pat. No. 4,302,230 describes a technique of pouring water over the substrate upon which deposition occurs in order to thermophoretically enhance the deposition process. However, this technique is disadvantageous in that it subjects the tube to severe thermal shock and possible cracking. Moreover, the structural integrity of the deposited particulate matter may be severely compromised. What is needed is an improved technique for enhancing the speed at which MCVD operations may be performed.

SUMMARY OF THE INVENTION

We have observed that inhomogenous dopant distribution and bubble formation constrain the maximum speed at which modified chemical vapor deposition (MCVD) may be performed. As the deposition rate is increased beyond a certain point, the dopant material exhibits a tendency to aggregate in the deposited particulate matter, such that the dopant is no longer distributed uniformly throughout the particulate matter. Consequently, gas bubbles form in the particulate matter, degrading the quality of the fiber optic cable.

The deposition rate of the MCVD process is enhanced by applying a plurality of independently controlled heat sources, including at least a first and a second heat source, to a plurality of reactants which are used to form deposited particulate matter. The first heat source is adjusted so as to provide at least a specified rate of reaction for the reactants, and the second source is adjusted so as to provide at least a specified deposition rate for the particulate matter.

DETAILED DESCRIPTION OF THE PREFERRED EMBODIMENTS

The invention is based upon a recognition that bubble formation constrains the maximum speed at which modified chemical vapor deposition (MCVD) may be performed. As the deposition rate is increased beyond a certain point, gas bubbles will form in the deposited particulate matter. To cite an example, many present-day fiber optic cables are fabricated using germania-doped silica, wherein the deposited particulate matter consists of $GeO_2$ and $SiO_2$. The high vapor pressure of $GeO_2$ relative to $SiO_2$ creates the potential for $GeO_2$ to vaporize, causing bubbles in the formed particulate matter. The quality of the fiber optic cable produced from this formed particulate matter is severely degraded by the presence of these bubbles.

Figure 1:
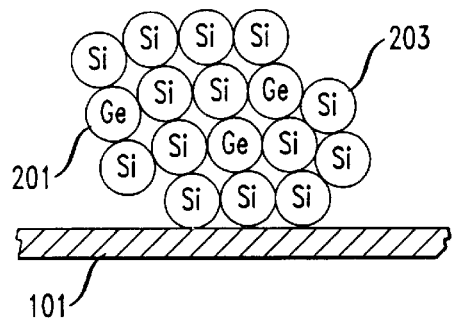
FIG. 1 is a magnified view of deposited particulate matter at a temperature representative of prior art MCVD processes.
Figure 2:
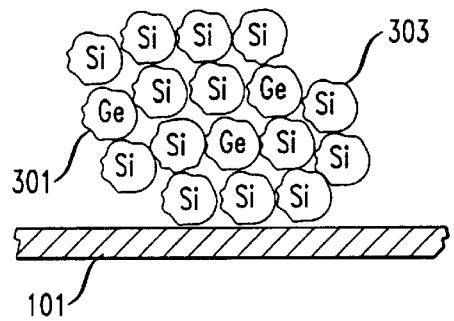
FIG. 2 is a diagrammatic representation of deposited particulate matter at a higher temperature than is representative of prior art processes.

The mechanisms responsible for bubble formation are better appreciated by examining FIGS. 1 and 2. FIG. 1 is a magnified view of deposited particulate matter at a first temperature, and FIG. 2 is a diagrammatic representation of deposited particulate matter at a second temperature higher than the first. The first temperature is representative of prior art deposition processes, and the second temperature is greater than would be used in the deposition phase of prior art MCVD techniques.

The deposited particulate matter consists of $GeO_2$ particles 201 (FIG. 1) and 301 (FIG. 2), as well as $SiO_2$ particles 203 (FIG. 1) and 303 (FIG. 2). Particles 201, 203, 301, and 303 are deposited along a substrate tube wall 101 which, in the present example, is fabricated of purified, clear, and solid $SiO_2$. Substrate tube wall 101, as shown in FIGS. 1 and 2, may represent a cross-sectional view of a portion of any of a variety of commercially-available hollow cylindrical $SiO_2$ glass tubes.

Upon examination of FIGS. 1 and 2, it is apparent that the $GeO_2$ particles 201 and $SiO_2$ particles 203 of FIG. 1 are rather rigid relative to the $GeO_2$ particles 301 and $SiO_2$ particles 303 of FIG. 2. The rigid $GeO_2$ particles 201 and $SiO_2$ particles 203 of FIG. 1 are roughly spherical in shape, and almost identical in size, with the result that there is a substantial amount of space between adjoining particles. The situation is analogous to the stacking of oranges or grapefruits at a supermarket, except for the fact that the air trapped between stacked citrus fruits is of little consequence, whereas vapor trapped between $GeO_2$ particles and $SiO_2$ particles may cause problems. Due to the fact that $GeO_2$ has a relatively high vapor pressure, especially as compared to the vapor pressure of $SiO_2$, some of the $GeO_2$ particles exhibit a tendency to vaporize during the MCVD process. $GeO_2$ particle 201, as illustrated in FIG. 1, is in the process of vaporizing into the space between a plurality of $SiO_2$ particles 203. Once $GeO_2$ particle 201 has vaporized, the resulting gas is trapped in the space between adjoining $SiO_2$ particles 203 and $GeO_2$ particles 201, forming a bubble.

A related factor which tends to exacerbate bubble formation is an inhomogenous distribution of the $GeO_2$ particles 201 relative to the $SiO_2$ particles 203. For example, consider the case where it is desired to fabricate $GeO_2$-doped $SiO_2$ fiber optic cable. A ratio of 3 mole % of $GeO_2$ to 97 mole % of $SiO_2$ is to be utilized. If some of the $GeO_2$ particles clump together, bubbles may form. The application of a sufficient amount of heat to the $GeO_2$ and $SiO_2$ particles ensures that the relatively small numbers of $GeO_2$ particles are more uniformly distributed throughout the $SiO_2$ particles.

As the temperature increases, the rigid $GeO_2$ particles 201 and $SiO_2$ particles 203 of FIG. 1 become increasingly more flexible and deformable. Instead of occupying a spherical volume, the particles deform in an attempt to fill up any unoccupied space between adjoining particles. These deformable particles, including $GeO_2$ particle 301 and $SiO_2$ particle 303, are illustrated in FIG. 2. It should be noted that each of the $GeO_2$ particles 201, 301 and $SiO_2$ particles 203, 303 shown in FIGS. 1 and 2 do not represent individual molecules of $GeO_2$ or $SiO_2$ but, rather, aggregations of thousands or millions of molecules. Due to the fact that the particles of FIG. 2 are deformable, there is very little open space between adjoining particles. The $GeO_2$ particles 301 do not vaporize, and it is possible to produce substantially bubble-free glass preforms.

Although it would be possible to provide higher deposition temperatures by increasing the output of a heat source used for the MCVD process, this approach has drawbacks. The MCVD process actually consists of three basic steps: (1) a chemical reaction which forms particles of glass soot, followed by (2) deposition of these particles by thermophoresis (heat transmission), and (3) consolidation of these particles by sintering. The optimal temperature, as well as the optimal time for which this temperature should be maintained, differ substantially from one process step to another. Increasing the output of the heat source would have the effect of providing increased heat throughout all the steps of the MCVD process, causing at least some of the steps to be performed at other than optimum temperatures. Moreover, these non-ideal temperatures would be maintained for a longer or shorter period of time than required for optimal results. For example, a much higher temperature is required for sintering than for chemical reactions and soot deposition. However, a longer residence time at a given temperature is beneficial for the chemical reaction, but of little benefit for the sintering step.

We have discovered that, by utilizing a control mechanism for ensuring that the proper amount of heat is applied during each step of the MCVD process, the deposition rate of the MCVD process can be enhanced. In accordance with a preferred illustrative embodiment of the present invention, this control mechanism is provided in the form of first and second independently controlled heat sources. These independently controlled heat sources are applied to a plurality of reactants used to form deposited particulate matter. The first heat source is adjusted so as to provide at least a specified rate of reaction for the reactants, and the second source is adjusted so as to provide at least a specified deposition rate for the particulate matter.

The use of first and second heat sources is described for illustrative purposes, as optional heat sources may be employed in addition to a first and a second heat source. Moreover, the first heat source and/or the second heat source could be implemented using a plurality of heat sources. At a minimum, two independently-controlled heat sources are required, but the use of heat sources in addition to the two aforementioned sources is within the contemplation of the invention.

The first and second independently-controlled heat sources may be adjusted using any of a number of techniques, illustrative examples of which include adjusting the temperatures of the first and second heat sources, regulating the amount of fuel provided to the heat sources, regulating the air-to-fuel ratio of the heat sources, regulating electrical current flow through the heat sources, regulating the amount of RF energy used to generate heat, adjusting the distance between the heat sources and the substrate tube, and/or any other adjustment technique.

Figure 3:
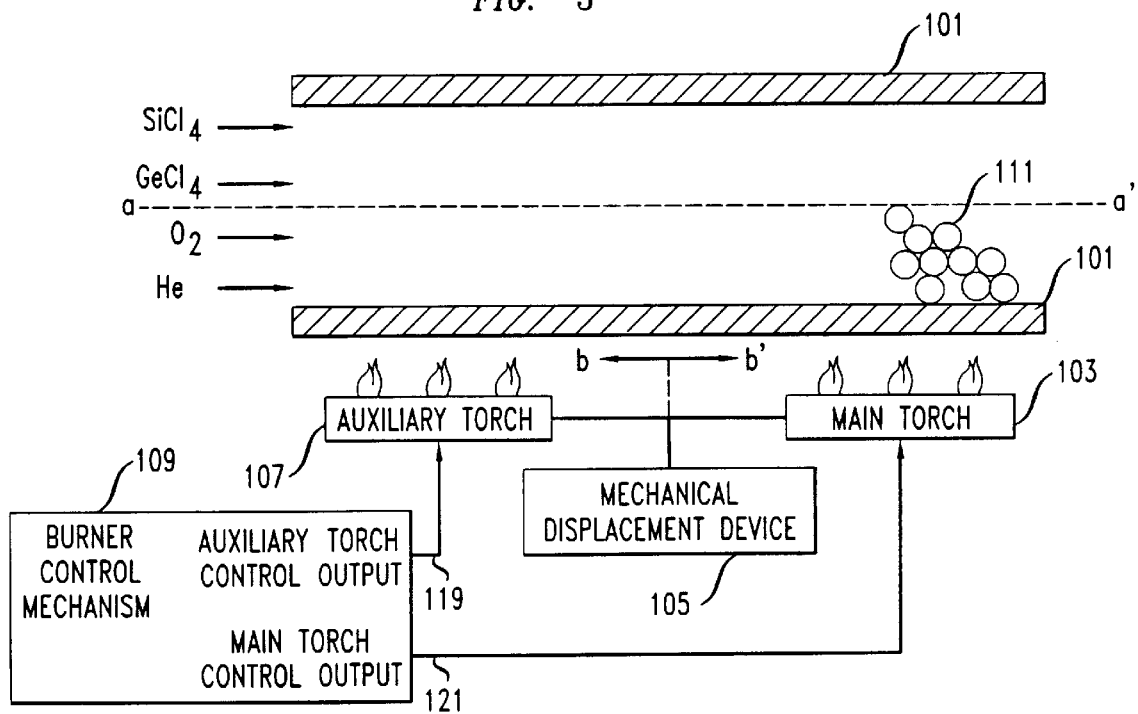
FIG. 3 is a diagrammatic representation of an apparatus suitable for practice of the deposition process in accordance with the invention.

Refer to FIG. 3 which sets forth a diagrammatic representation of an apparatus suitable for practicing the MCVD process in accordance with the invention. Gas phase precursor reactants are introduced into a first end of a substrate tube, a cross-sectional view of which is shown in FIG. 3 as substrate tube wall 101. In the present example, the reactant materials are $SiCl_4$, $GeCl_4$, and $O_2$. He gas is used to improve the thermal transfer properties of the MCVD process. $SiCl_4$ and $GeCl_4$ are employed as reactants for illustrative purposes only. Reactant materials may include, for example, chlorides and hydrides, as well as other compounds which will react with $O_2$. As in other vapor reaction processes, any of various additional gaseous materials, such as He, may be introduced to enhance the thermal transfer characteristics of the reaction, and/or to act as a diluent to control the rate of reaction. For example, hydrides are highly reactive with $O_2$ and very combustible, rendering the use of a suitable diluent highly desirable.

Pursuant to prior art MCVD approaches, the tube and the reactants contained therein are heated to a homogenous reaction temperature within a moving hot zone produced by a single moving heating means. An example of such a heating means is shown in FIG. 3 as main torch 103. A mechanical displacement device 105 moves main torch 103 back and forth along axis b–b'. This movement occurs at a speed on the order of about 30 to 200 mm/minute, creating a hot zone about 2 cm long along the length of the tube. Although mechanical displacement device 105 is shown as moving auxiliary torch 107 and main torch 103 in unison, this is for illustrative purposes, as mechanical displacement device could alternatively control the movements of main torch 103 independently of auxiliary torch 107. Throughout the entire MCVD process, the substrate tube may be rotated about its axis of symmetry, shown in FIG. 3 as axis a–a'. A typical rotational speed is on the order of about 20 to 80 rpm. The substrate tube may be placed into a lathe, not shown, which provides this rotational motion.

The homogenous reaction temperature of the reactants may be determined by gradually increasing the temperature, and/or increasing the flow of reactants in the tube, until a homogenous chemical reaction is observed within the tube. For the usual silica-based systems which are used to fabricate fiber optic cable, temperatures at the substrate tube wall 101 are generally maintained at a minimum of 1200 degrees Celsius within the moving hot zone.

In accordance with the preferred embodiment of the invention, an auxiliary torch 107 is utilized in conjunction with main torch 103. Importantly, the effective thermal output of the main torch 103 is controlled independently of the effective thermal output of auxiliary torch 107. This may be accomplished, for example, by controlling the temperatures of the main and auxiliary torches 103, 107, and/or by using any of the techniques described above. In the example of FIG. 3, a burner control mechanism 109 is provided which has a first, auxiliary torch control output 119 for controlling auxiliary torch 107, and a second, main torch control output 121 for controlling main torch 103. The temperatures of the main and auxiliary torches 103, 107, respectively, may be controlled by controlling the fuel and/or oxidant flow of the respective torch. Although any of various substances could be used to fuel main torch 103 and auxiliary torch 107, these torches are typically operated using a controlled mixture of $H_2$ and $O_2$ gas. $H_2$ and $O_2$ provide a flame that is sufficiently hot so as to maintain temperatures of 1200 degrees Celsius or greater within the substrate tube.

Main torch 103 may be implemented using a ring burner, suitable examples of which are well known to those skilled in the art. Such a ring burner is generally comprised of a single line of burners arranged in a circle around the circumference of the substrate tube. Although auxiliary torch 107 could also be implemented using a ring burner, other types of burner arrangements are possible and may provide advantages over a ring burner configuration. In the example of FIG. 3, auxiliary torch 107 is a linear burner with gas outlets arranged substantially in a line that is positioned so as to be substantially parallel to axis a–a'.

The physical configurations employed for main torch 103 and auxiliary torch 107 are determined with reference to the somewhat disparate functions which each of these torches is called upon to perform. MCVD requires the performance of three basic functions: particulate formation, deposition, and sintering. Particulate formation refers to the step of heating a plurality of gaseous reactants so as to form soot particles. Deposition refers to the step of transmitting heat to the soot particles such that the particles are deposited on the substrate tube wall, and sintering is the consolidation of the deposited particles into a substantially homogenous mass. Sintering requires more heat than particulate formation and deposition. However, a longer residence time at a specified temperature is more beneficial for particulate formation than for sintering.

Figure 4:
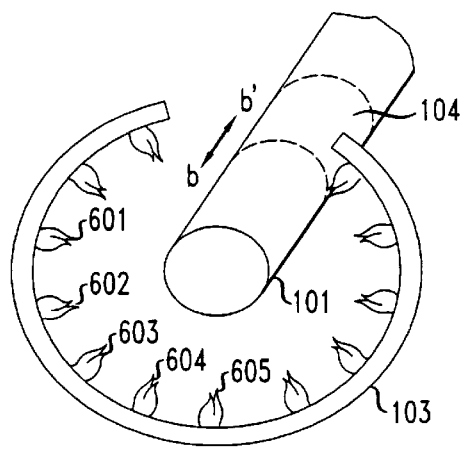
FIG. 4 shows a perspective view of an illustrative main torch and an illustrative auxiliary torch which may be used to practice the invention.
Figure 4:
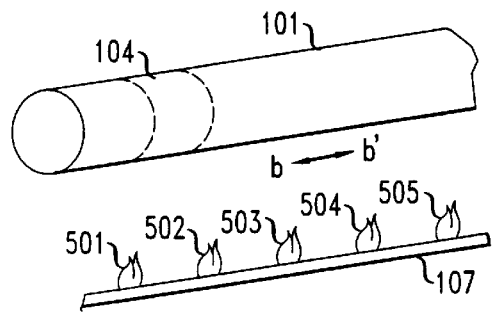

In view of the foregoing considerations, and according to an embodiment of the invention, a first torch (main torch 103) is designed so as to provide a relatively high temperature suitable for sintering. In order to enhance the particle formation step, a second torch (auxiliary torch 107) is designed so as to provide a lower temperature than the first torch, but this lower temperature needs to be maintained within the substrate tube for a greater period of time than is the case for the first torch. Illustrative structures for main torch 103 and auxiliary torch 107 are shown in FIG. 4. Due to the fact that substrate tube 101 is in constant back-and-forth motion in the b–b' direction, a specified region 104 of the substrate tube will be in physical proximity to burners 601, 602, 603, 604, 605 of main burner 103 for a relatively short period of time as compared to the length of time that this specified region 104 is in physical proximity to a burner 501, 502, 503, 504, 505 of auxiliary burner 107. However, all burners 601, 602, 603, 604, and 605 of main burner 103 will be physically proximate to the specified region 104 at the same time. By contrast, each burner 501, 502, 503, 504, 505 of auxiliary burner is successively passed in close proximity to specified region 104. Thus, auxiliary burner 107 generates less intense heat for a longer period of time than main burner 103.

Figure 5:
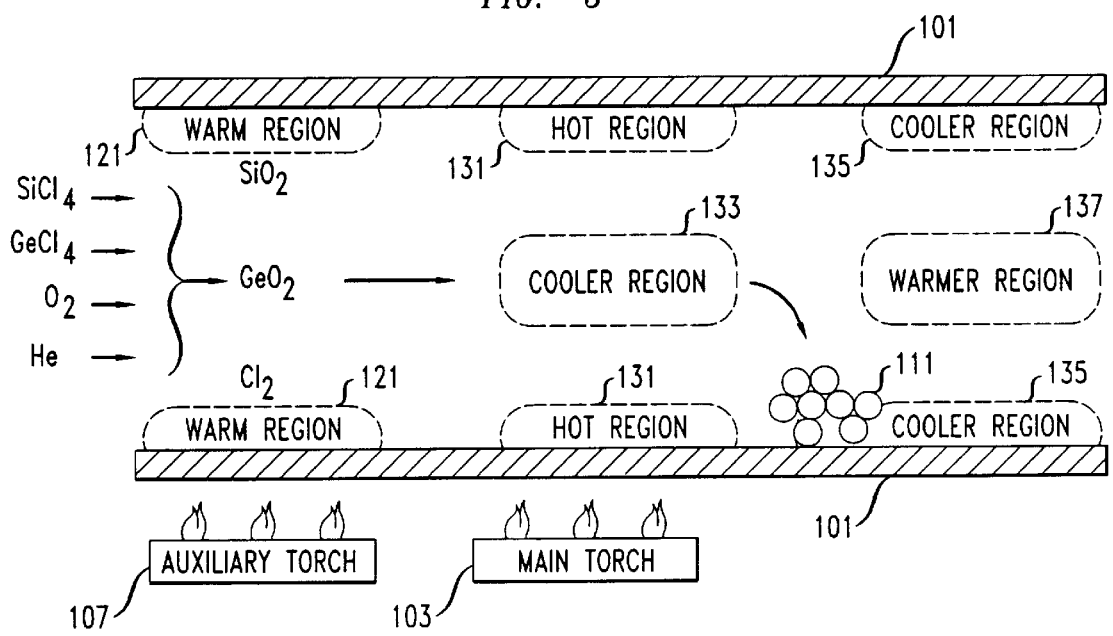
FIG. 5 is a diagrammatic representation showing temperature gradients within an apparatus suitable for practice of the deposition process in accordance with the invention.

The thermal gradients provided by main torch 103 and auxiliary torch 107 are shown in FIG. 5. Auxiliary torch 107 provides a warm region 121 at or above a temperature at which a plurality of reactants will undergo a chemical reaction within a specified period of time. In the example of FIG. 5, the reactants are $SiCl_4$, $GeCl_4$, and $O_2$. Warm region 121 provides sufficient thermal energy to drive two chemical reactions: a first chemical reaction between $SiCl_4$ and $O_2$, to yield $SiO_2$ soot particles and $Cl_2$ gas; and a second chemical reaction between $GeCl_4$ and $O_2$, to yield $GeO_2$ soot particles and $Cl_2$ gas. Main torch 103 provides a hot region 131 near the substrate tube wall 101 where the heat is most intense. The heat is less intense near the central axis a–a' of substrate tube 101, in cooler region 133. Although at least a substantial portion of hot region 131 is at a higher temperature than warm region 121, observe that warm region 121 occupies a greater area than hot region 131. Moving downstream, or, in other words, to the right, of main torch 103, the heat from the main torch reaches the central axis a–a' of the substrate tube, providing warm region 137. Meanwhile, the substrate tube wall 101 is in the process of cooling off, creating a cooler region 135 in those portions of the tube nearest the substrate tube wall.

The $SiO_2$ and $GeO_2$ soot particles have a tendency to migrate from hotter areas to cooler areas. Accordingly, these particles remain near the central axis a–a' of the substrate tube, in cooler region 133, while traversing that section of the tube closest to main torch 103. As the particles move downstream, and the areas of the tube nearest the tube wall 101 start to cool off, the particles are drawn to the cooler region 135 near the tube wall 101, and the particles begin to deposit themselves along the tube wall.

The use of main torch 103 and auxiliary torch 107 enables enhanced thermal control of the MCVD process. By way of illustration, where MCVD is used to fabricate fiber optic cable of $GeO_2$-doped $SiO_2$, $GeO_2$ particles are first formed at the relatively low temperatures provided by auxiliary torch 107. The $GeO_2$ particles provide nucleation sites for $SiO_2$ particles which form at a higher temperature. Since $GeO_2$ particles are encapsulated by $SiO_2$ particles, $GeO_2$ is readily dissolved in $SiO_2$. Upon such dissolution, the $GeO_2$-doped silica particles have a much lower vapor pressure than in the example of FIG. 1, and bubble formation is prevented.

By contrast, in prior art processes, $GeO_2$ and $SiO_2$ particles are formed simultaneously within a single hot zone produced by a single torch, i.e., main torch 103. The $GeO_2$ particles are not distributed homogeneously throughout the deposited $SiO_2$ particles. As described above, the $GeO_2$ particles become trapped within closed pores in $SiO_2$ soot and then vaporize to cause bubbles.

Although the use of tandem torches has been described in the context of MCVD processes to manufacture $GeO_2$-doped $SiO_2$ fiber optic cable, this is for illustrative purposes. Pursuant to the techniques of the invention, more than two torches may be utilized and, moreover, such torches may be utilized in virtually any processes that require controlled rates for different chemical reactions, or that require a complete chemical reaction prior to deposition and sintering, as in MCVD. In the above-described context of fiber optic cable manufacturing, the use of tandem torches permits a relatively high rate of core deposition by minimizing or eliminating the problem of bubble formation. Pursuant to an alternate embodiment of the invention, a plurality of independently controlled torches may be employed to provide a fiber optic cable having a substantially uniform dopant concentration.

The apparatus shown in FIG. 3 may be used to produce a fiber optic cable having a uniform dopant concentration. The apparatus is operated as discussed previously with respect to the $GeO_2$-doped $SiO_2$ fiber optic cable, except for the fact that, initially, the temperatures of the main and auxiliary torches 103, 107, respectively, are not sufficiently high so as to permit sintering of the $SiO_2$ and $GeO_2$ soot particles. Alternatively, for purposes of the present example, the reactant $GeCl_4$ shown in FIG. 3 could be eliminated, and, in this case, only $SiO2$ soot particles would be formed. If only $SiO_2$ particles are to be formed, the temperature of the auxiliary torch 107 is adjusted so as to facilitate a chemical reaction between $SiCl_4$ and $O_2$ to yield $SiO_2$, but not so high so as to cause sintering. Similarly, if both $GeO_2$ and $SiO_2$ particles are to be formed, the temperature of the auxiliary torch is adjusted so as to facilitate a first chemical reaction between $GeCl_4$ and $O_2$ to yield $GeO_2$, and a second chemical reaction between $SiCl_4$ and $O_2$ to yield $SiO_2$, but not so high as to cause sintering. The temperature of main torch 103 is adjusted so as to facilitate the formation of a layer of white or gray soot on substrate tube wall 101, consisting of either $SiO_2$ particles only, or both $SiO_2$ and $GeO_2$ particles.

After the layer of white soot is formed, the substrate tube is placed into a chemical bath containing a rare earth solution such as $ErCl_3$. Once a desired or specified amount of Er dopant has been dissolved into the $SiO_2$ soot, the substrate tube is removed from the bath and placed in proximity to main torch 103 and, optionally, auxiliary torch 107. The temperature of main torch 103 is adjusted so as to facilitate sintering of the $SiO_2$ soot particles.

In the aforementioned example, the use of tandem torches provides an Er-doped $SiO_2$ fiber optic cable having a substantially uniform concentration of dopant. The tandem torch configuration achieves this desired result by providing a substantially uniform unconsolidated layer of soot particles. Dopants may then be incorporated into this unconsolidated layer, using the solution doping method well-known to those skilled in the art. In manufacturing the unconsolidated soot layer, the temperatures of the torches cannot exceed the sintering temperature, thereby preventing a complete consolidation of the soot layer.

Pursuant to the prior art approach of using a single torch, the temperature of this torch must be adjusted to a relatively high temperature in order to bring about a chemical reaction between $SiCl_4$ and $O_2$ to form $SiO_2$. Such a high temperature reaction leaves behind a small amount of residual reaction byproducts which deposit on the substrate tube walls along with the desired $SiO_2$ particles. These byproducts may cause localized sintering and, thus, a nonuniform density of the formed soot layer. In some cases, the volatile decomposition of these residual reaction byproducts may cause a localized discontinuity of the soot layer structure during sintering.

The use of tandem torches overcomes the problem of structural discontinuities in the soot layer. The auxiliary torch 107 is adjusted to provide less heat than main torch 103, but this lower heat is provided for a longer period of time. This longer period of time is sufficiently lengthy so as to facilitate a chemical reaction of the reactants at a lower temperature than in the prior art. This ensures that substantially all reaction byproducts are completely converted to oxide particles ($SiO_2$, $GeO_2$, etc), to result in a soot layer having a substantially uniform density.

The foregoing description merely serves to illustrate the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended to be only for pedagogical purposes so as to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Moreover, it is intended that such equivalents include both currently known equivalents, as well as equivalents developed in the future that perform the same function, regardless of structure.

We claim:

1. A method for performing modified chemical vapor deposition characterized by the steps of applying a plurality of independently controlled heat sources to a plurality of reactants which are used to form deposited particulate matter, wherein at least one of the plurality of heat sources provides a first region at which the plurality of reactants undergo chemical reaction to form the particulate matter, and wherein at least another of the plurality of heat sources provides a second region at which deposition of the particulate matter is facilitated and at which substantially no chemical reaction to form particulate matter occurs.

2. The method of claim 1 wherein the at least one of the plurality of heat sources is adjusted so as to provide at least a specified rate of reaction for the reactants, and the at least another of the plurality of heat sources is adjusted so as to provide at least a specified deposition rate for the particulate matter.

3. The method of claim 2 wherein the heat sources are adjusted by any of:

(a) adjusting the temperatures of the heat sources;

(b) regulating an amount of fuel provided to the heat sources (c) regulating an air-to-fuel ratio of the heat sources;

(d) regulating a flow of electrical current through the heat sources;

(e) regulating an amount of RF energy used to generate heat for the heat sources;

(f) adjusting the distance between the heat sources and a substrate tube; or (g) any combination of (a)–(f).

4. The method of claim 1 wherein the chemical reactants include $SiCl_4$ and $O_2$ which react to form $SiO_2$ and $Cl_2$.

5. The method of claim 4 wherein the chemical reactants further include $GeCl_4$ and $O_2$ which react to form $GeO_2$ and $Cl_2$.

6. The method of claim 1, wherein the first region is provided by a first, single, independently-controlled heat source, and the second region is provided by a second, single, independently-controlled heat source.

7. The method of claim 6 further comprising the step of consolidating the glass soot by sintering, wherein sintering is performed using the first heat source, the second heat source, or both the first and the second heat source.

8. A method of performing modified chemical vapor deposition (MCVD) comprising the following steps:

(a) heating a plurality of chemical reactants so as to cause a chemical reaction wherein particulate matter is formed;

(b) controlling the temperature of the particulate matter such that the matter is deposited onto a surface; and (c) consolidating the particulate matter by sintering; wherein steps (a), (b) and (c) are performed by applying a plurality of independently controlled heat sources to the particulate matter, at least one of the plurality of heat sources providing a first region at which the plurality of reactants undergo the chemical reaction, and at least another of the plurality of heat sources providing the temperature control and providing a second region at which deposition of the particulate matter onto the surface is facilitated and at which substantially no chemical reaction to form particulate matter occurs.

9. The method of claim 8 wherein the first region is provided by a first, single, independently-controlled heat source, and the second region is provided by a second, single, independently-controlled heat source.

10. A method of manufacturing a fiber optic cable using a plurality of independently-controlled heat sources and comprising the steps of:

(a) using at least one of the plurality of heat sources to heat a plurality of chemical reactants in a first region so as to cause a chemical reaction wherein glass soot is formed in the first region; and (b) using at least another of the plurality of heat sources to control the temperature of the glass soot in a second region such that the glass soot is deposited onto a surface in the second region in the substantial absence of chemical reaction to form glass soot.

* * * * *